(12) United States Patent
Schaedler

(10) Patent No.: US 6,769,236 B2
(45) Date of Patent: Aug. 3, 2004

(54) THIN LAWN MOWER BLADE

(75) Inventor: Axel Schaedler, Olmstead Falls, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 10/260,977

(22) Filed: Sep. 27, 2002

(65) Prior Publication Data
US 2003/0074874 A1 Apr. 24, 2003

Related U.S. Application Data

(63) Continuation-in-part of application No. 09/782,800, filed on Feb. 13, 2001, now abandoned.
(60) Provisional application No. 60/247,905, filed on Nov. 14, 2000.

(51) Int. Cl.$^7$ .................................................. A01F 34/64
(52) U.S. Cl. .......................................... 56/295; 56/255
(58) Field of Search .......................... 56/255, 295, 175, 56/DIG. 16, DIG. 20

(56) References Cited

U.S. PATENT DOCUMENTS

| 3,910,017 A | 10/1975 | Thorud et al. | |
|---|---|---|---|
| 3,964,243 A | 6/1976 | Knipe | |
| 3,975,891 A | 8/1976 | Gunther | |
| 4,043,104 A | * 8/1977 | Jones | 56/295 |
| 4,205,512 A | 6/1980 | Thorud | |
| 4,321,097 A | 3/1982 | Kerr | |
| 4,374,465 A | * 2/1983 | Comer | 56/12.7 |
| 4,383,677 A | 5/1983 | Kerr | |
| 4,532,708 A | 8/1985 | Mensing | |
| 4,594,843 A | 6/1986 | Andersson et al. | |
| 4,936,884 A | 6/1990 | Campbell | |
| 5,035,108 A | 7/1991 | Meyer et al. | |
| 5,467,586 A | 11/1995 | Lin et al. | |
| 5,501,068 A | 3/1996 | Martz | |
| 5,775,078 A | 7/1998 | Warren | |
| 5,839,263 A | 11/1998 | Biernath et al. | |
| 5,906,053 A | 5/1999 | Turner et al. | |
| 5,916,114 A | 6/1999 | Turner | |
| 5,960,619 A | 10/1999 | Seidel et al. | |

\* cited by examiner

Primary Examiner—Thomas B. Will
Assistant Examiner—Meredith Petravick
(74) Attorney, Agent, or Firm—Roger D. Emerson; Timothy D. Bennett; Brouse McDowell

(57) ABSTRACT

A lawn mower blade having a thickness of approximately 0.075 inches comprises a main body, an elevational profile, and end portions equidistant from the center of the blade. The elevational profile consists of a raised portion that reaches a height at the plateau portion at the center of the blade. The elevational profile increases at an angle α as the end portions approach the plateau. Each of the first and second end portions has a cutting edge portion. The height to blade thickness ratio is at least two-to-one. Further, since the mower blade is generally not heat treated, ribbing is added to the mower blade to provide strength.

28 Claims, 7 Drawing Sheets

THIN LAWN MOWER BLADE

This application is a Continuation-In-Part of U.S. Utility patent application Ser. No. 09/782,806, filed on Feb. 13, 2001, now abandoned which claims priority from U.S. Provisional Patent Application Serial No. 60/247,905, filed on Nov. 14, 2000.

BACKGROUND OF THE INVENTION

A. Field of Invention

This invention relates to a thin lawn mower blade. More specifically, the invention is a lawn mower blade having a maximum height to blade thickness ratio of at least two-to-one.

B. Description of the Related Art

Lawn mower blades typically have a thickness ranging from 0.150 to 0.250 inches. Known lawn mower blades generally have maximum blade height to blade thickness ratios of approximately one-to-one or just slightly larger. Similarly, bossed sections are usually not integrated into blade designs, but if they are, they are typically very small. Typical manufacture includes the steps of placing a piece of steel or other suitable material in a machine and then stamping it to arrive at the desired shape. After the blade is shaped, heat treatment is performed to increase the strength and durability of the blade.

While current mower blade designs are suitable for their intended purposes, many improvements could be made. For example due to typical blade thickness and corresponding blade weight, the amount of power needed to accelerate and stop the blade is greater than if the blade were not as heavy. Further, damage may occur to mower blades from shock caused by impacting certain obstacles. If the heat-treated lawn mower blade encounters sandy conditions, such as but not limited to those found in coastal regions, then the blades suffer significant wear and tear because the sand impacts the mower components with such force that "sand-blasting" may occur. Thus, the integrity of the mower blade may decrease over time in sandy conditions.

U.S. Pat. No. 5,775,078 to Warren discloses a mower blade having a blade thickness of 0.25 inches. The maximum height of the blade profile is 0.375 inches. This results in a maximum height to blade thickness ratio of about 1.5. This blade however, does not solve the problem, as does the present invention.

Therefore, there is a need in the art to provide a thin lawn mower blade, which has a maximum height to thickness ratio of at least two to one. It is also desirable to provide a lawn mower blade that is capable of accelerating and stopping quickly and is resistant to various shocks it may encounter, including without limitation, sand. Thus, the current invention provides that the difficulties inherent in thee art are overcome in a way that is simple and efficient, while providing better and more advantageous results.

SUMMARY OF THE INVENTION

The present inventive mower blade comprises a main body portion as well as first and second end portions substantially equidistant from the center of rotation, where each of the first and second end portions has a cutting edge portion. Further, the mower blade comprises a maximum height, usually located about the center of rotation. The maximum height to thickness ratio is at least two-to-one.

Accordingly, it is an object of the present invention to provide a mower blade that has a raised center and a high elevational profile, such that a cavity is defined thereunder.

Another object of the present invention is to provide a mower blade comprising a pair of oppositely disposed flange portions operatively connected to the end portions opposite of the cutting edge portion. Each flange portion extends upwardly from each respective end portion, such that airflow properly positions the associated underlying vegetation to be cut.

Still yet another object of the present invention is to provide a lawn mower blade having a maximum height located at the center of rotation.

Further, another object of the present invention is to provide a lawn mower blade having a maximum height-to-blade thickness ratio of at least ten-to-one.

Further, another object of the present invention is to provide a lawn mower blade having a maximum height-to-blade thickness ratio of about least sixteen-to-one.

Another object of the present invention provides a lawn mower blade having a longitudinal axis and a raised center portion, wherein said raised center portion extends about the longitudinal axis, such that the total length of the lawn mower blade is greater than the length of the raised center portion.

Another object of the present invention is to provide a lawn mower blade wherein the high elevational profile increases at an angle as the first and second end portions approach a plateau portion of the raised center portion.

Still yet, another object of the present invention is to provide a lawn mower blade having a raised center portion with a width, wherein, the width is greatest about a transverse axis of the blade. The transverse axis intersects the center of rotation and the width gradually decreases as the raised center portion extends past the plateau portion and towards the first and second end portions.

Still another object of the present in invention is to provide a lawn mower blade having a blade width, wherein the raised center portion width is less than the blade width.

Still yet, another objective of the present invention is to provide a lawn mower blade made of a non-heat treated material.

Another objective of the present invention is to provide a lawn mower blade that has a higher yield strength at the cutting edge portion than the raised center portion, first and second end portions and said flange portions.

Another object of the present invention is to provide a lawn mower blade that is light-weight and that accelerates and stops with less force than known blades.

Still yet, another object of the present invention is to provide a lawn mower blade that absorbs energy on impact.

Yet another object of the present invention is to provide a lawn mower blade that is easy and economical to manufacture.

BRIEF DESCRIPTION OF THE DRAWINGS

The invention may take physical form in certain parts and arrangement of parts; a preferred embodiment of which will be described in detail in this specification and illustrated in the accompanying drawings, which form a part hereof and wherein.

DESCRIPTION OF THE PREFERRED EMBODIMENT

With reference now to FIGS. 1–5, a thin lawn mower blade 10 will now be described. The blade 10 is intended for use in cutting associated vegetation by rotating the blade against such associated vegetation within a cutting unit or mower deck. The use of such cutting units and mower decks is well known in the art and thus will not be discussed further here. It should be noted, however, that the inventive blade design herein described could be used in other applications as well.

Figure 1:
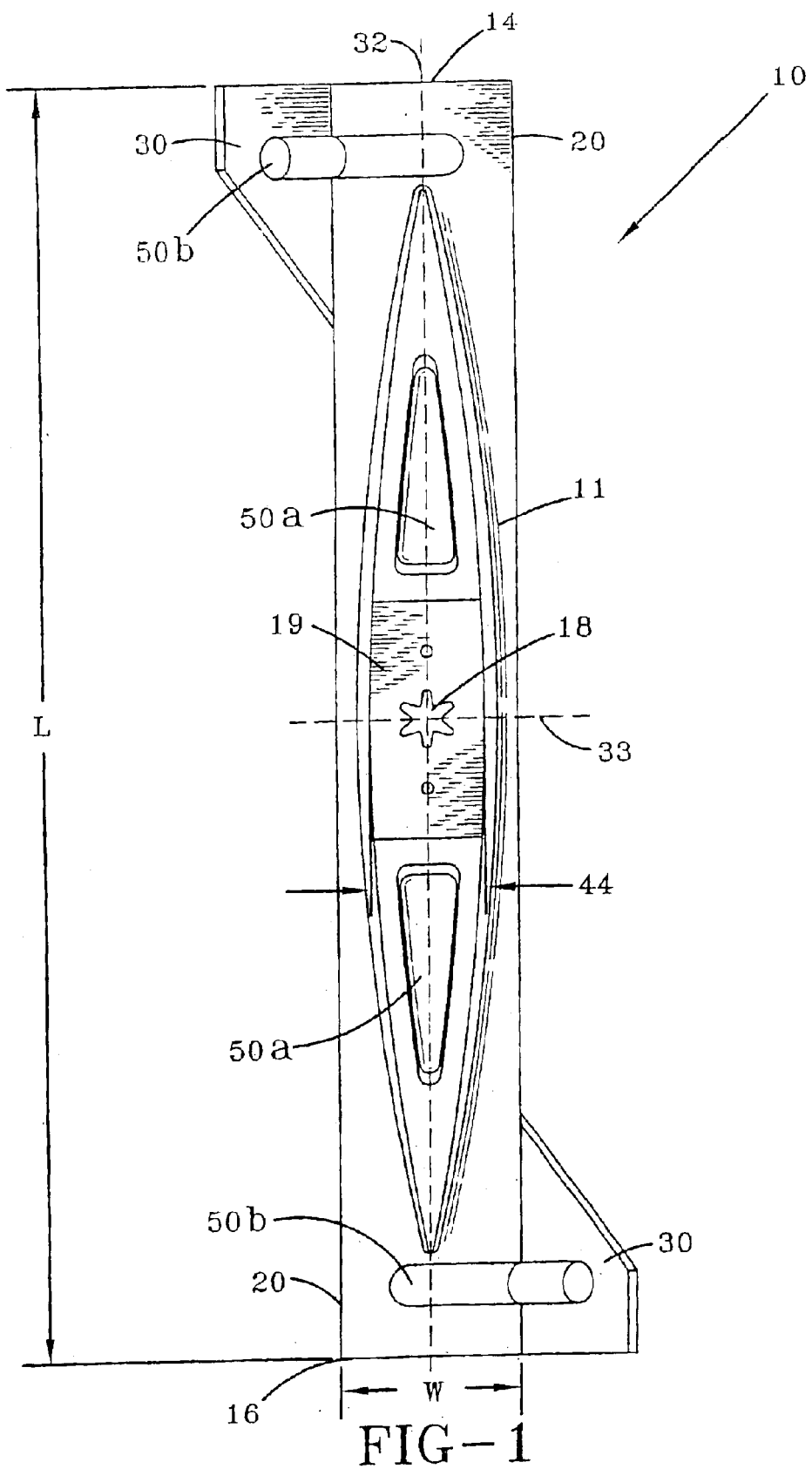
FIG. 1 is a plan view of the present invention.
Figure 2:
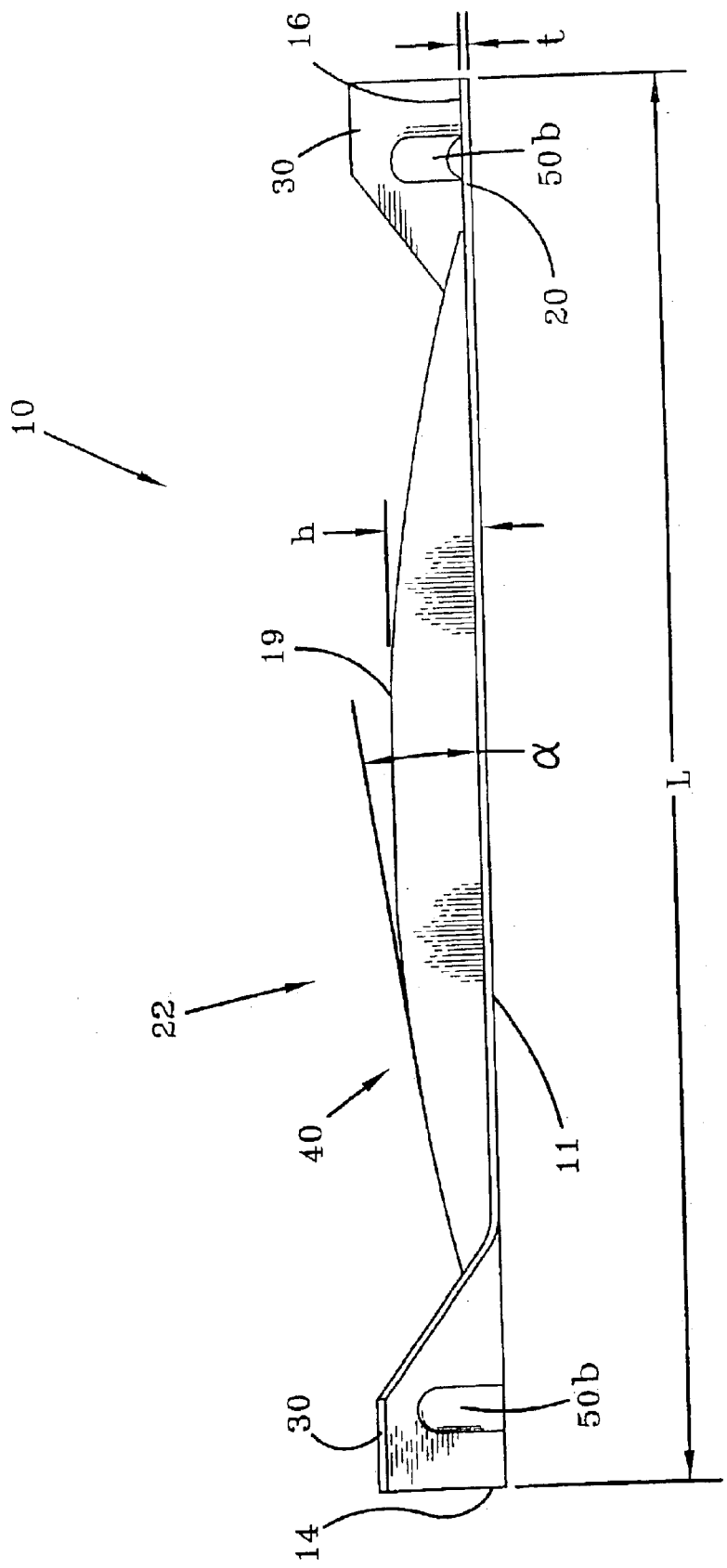
FIG. 2 is an elevation view of the present invention.
Figure 3:
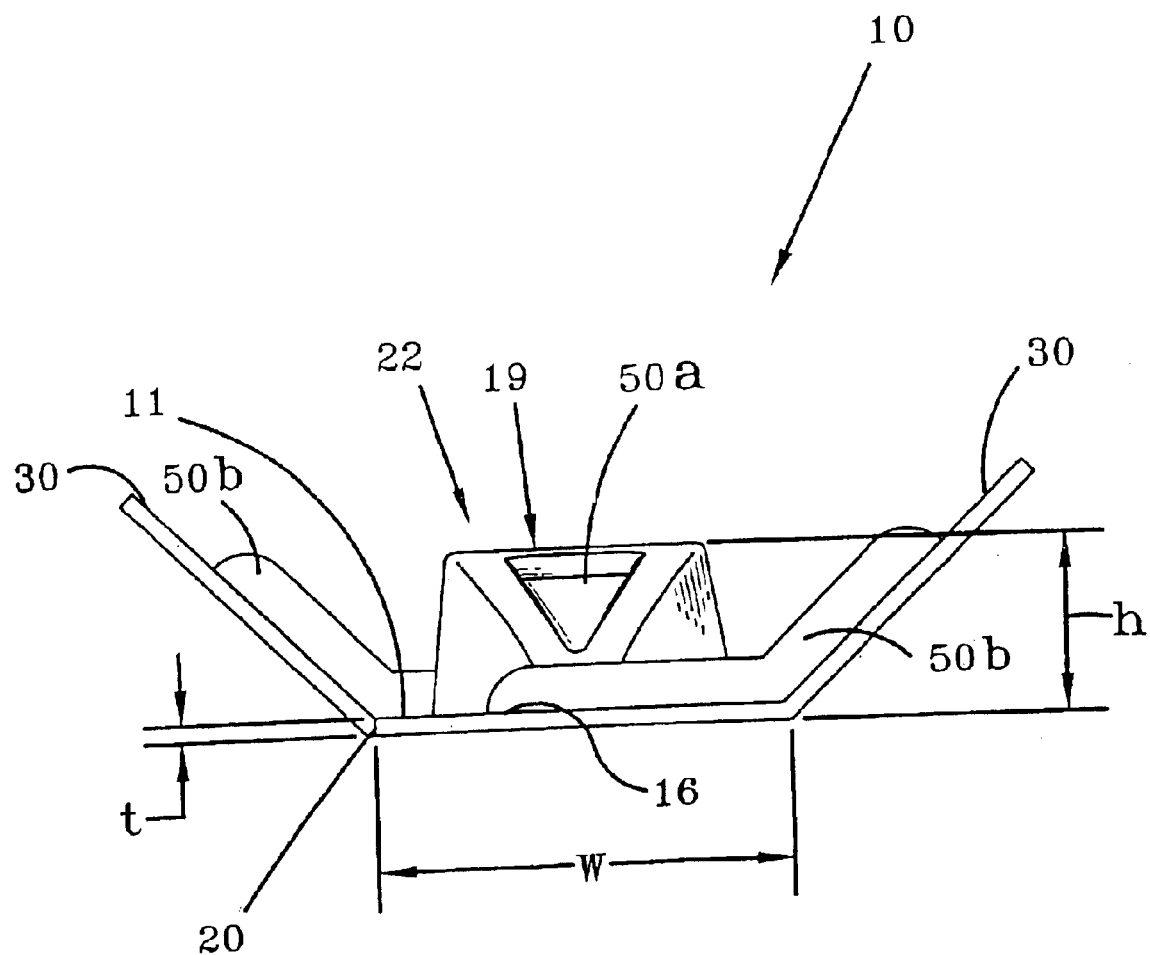
FIG. 3 is an end view of the present invention.
Figure 4:
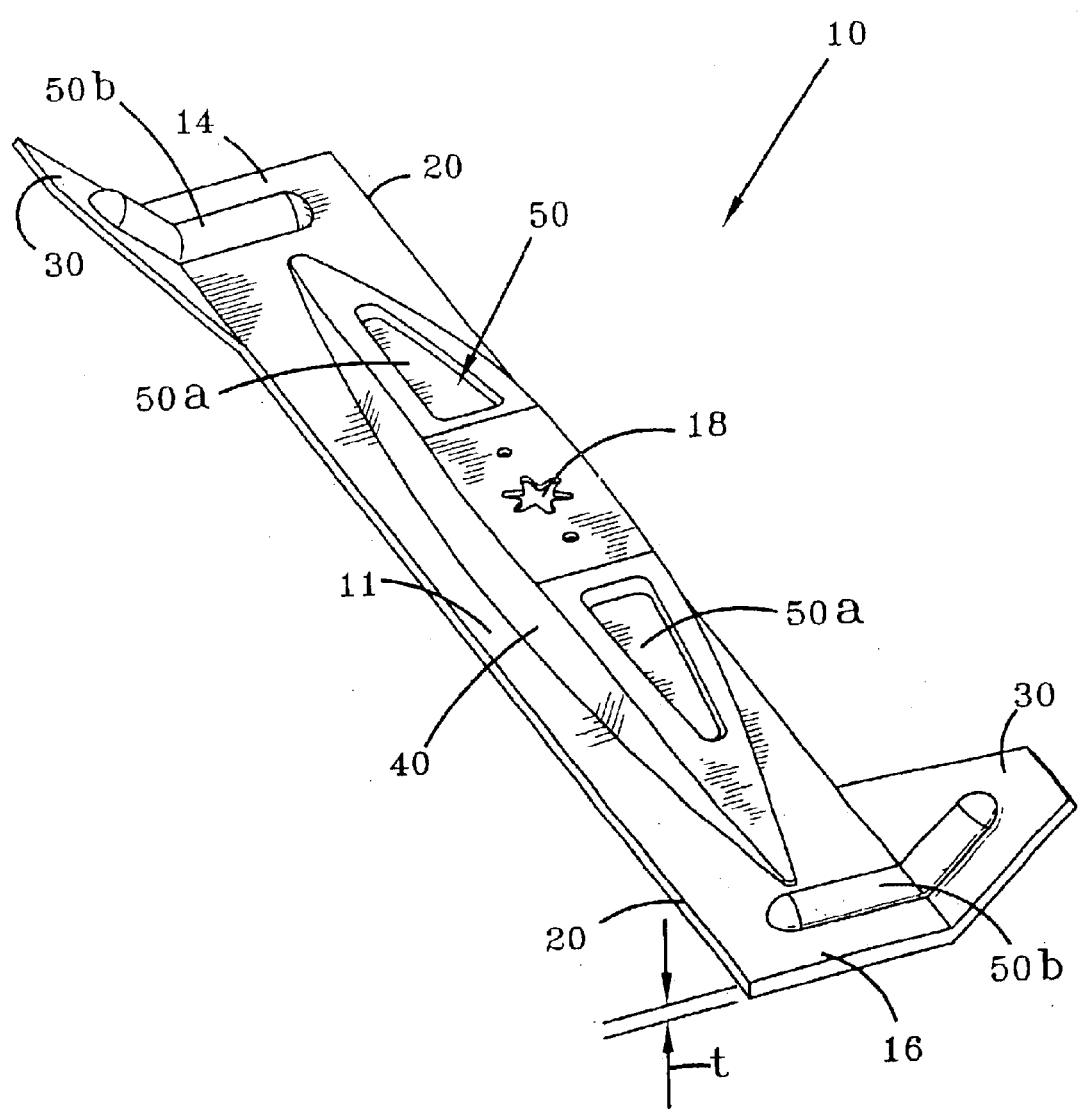
FIG. 4 is a perspective view of the present invention.

Referring now to FIGS. 1–3, the thin lawn mower blade 10 comprises a main body portion 11 as well as first and second end portions 14, 16 that extend substantially equidistant from a center of rotation centered within opening 18. The opening 18 is used to attach the blade 10 to an associated cutting unit or mower deck in a way well known in the art. The first and second end portions 14, 16 may include a cutting edge portion 20 for use in cutting associated vegetation. The main body portion, 11 has a blade thickness t (seen best in FIGS. 2 and 3), a blade length L, (seen best in FIG. 1), and a blade width W (seen best in FIG. 1). It should be noted that the width W does not include any portion of later to be described flange portions 30.

With continuing reference to FIGS. 1–3, the cutting edge portions 20 are generally made of a substance that is harder than the main body portion 11 since the cutting edge portions 20 are utilized to cut vegetation. The lawn mower blade 10 also comprises a raised center portion 22 having a high elevational profile 40 and a plateau portion 19. The mower blade 10 also has a maximum height h, as seen in FIG. 2, which may be located about the center of rotation 18. However, the maximum height h may be located along any position of the mower blade 10. The preferred ratio (h/t) of the maximum blade height h to the blade thickness t is for this inventive blade at least two-to-one (2/1). The blade 10 as shown has a thickness t of about 0.075 inches. This thickness is at least half the thickness of known blades and thus provides for an overall reduced blade weight The ratio (h/t) of the current invention (at least 2/1) provides for sufficient structural rigidity to endure the stresses caused by rotation of the blade 10 and stopping of such rotation while simultaneously permitting the reduced thickness t. More preferably, the ratio h/t is greater than ten to one (10/1) to maximize the benefits noted above. In the most preferred embodiment, shown in FIGS. 1–3, this ratio (h/t) is approximately sixteen-to-one (16/1). For some applications it may be desirable to increase the ratio (h/t) even higher. All such increases in the ratio (h/t) are considered incorporated by this invention.

Figure 5:
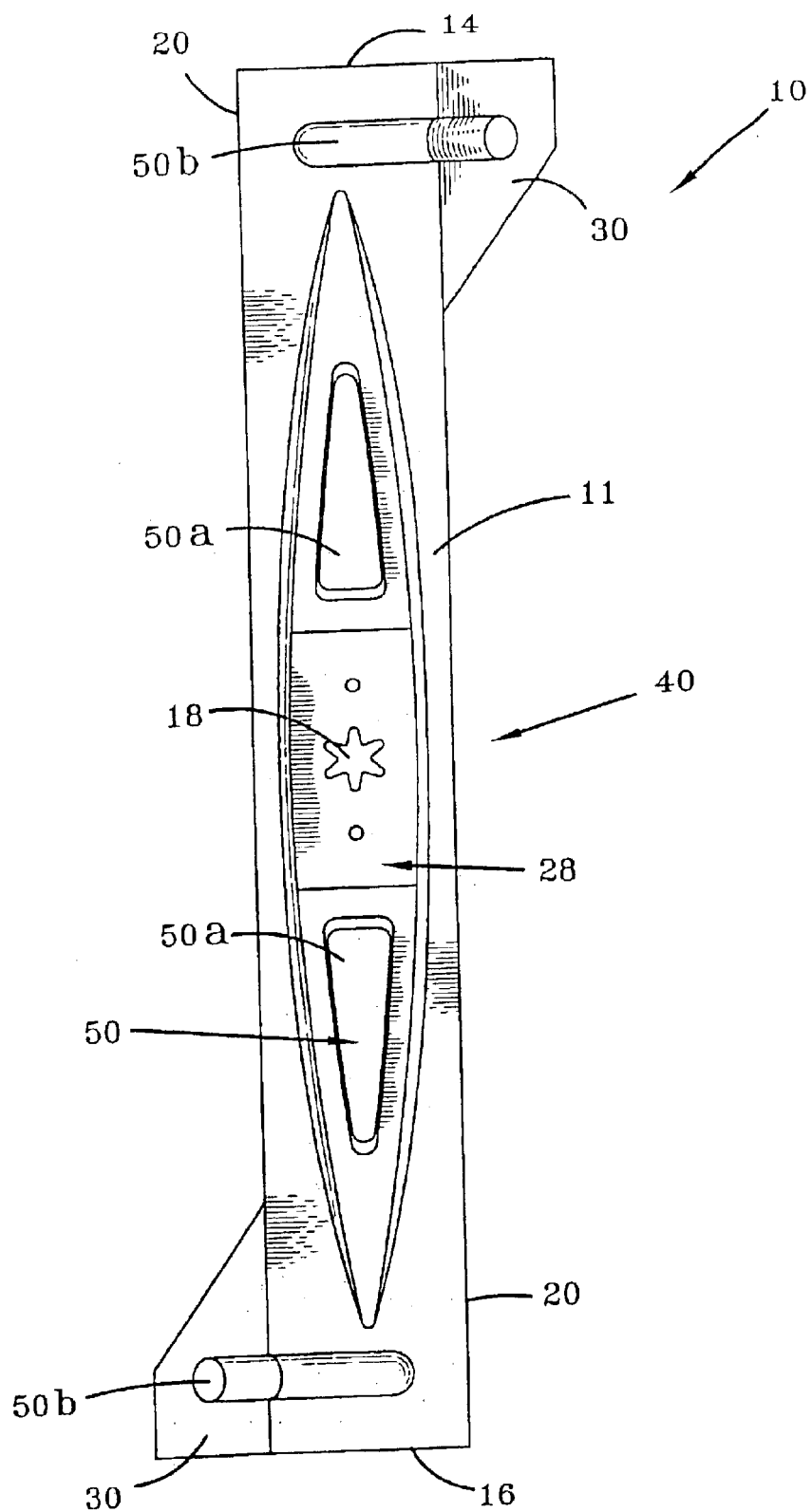
FIG. 5 is a bottom view of the present invention.

With reference now to FIGS. 1 and 5, the lawn mower blade's 10 high elevational profile 40 defines a cavity 28 thereunder, best seen in FIG. 5. The lawn mower blade 10 also comprises a pair of oppositely disposed flange portions 30, operatively connected to the end portions 14, 16 opposite the cutting edge portions 20. Each flange portion 30 extends upwardly from each respective end portion 14, 16, such that airflow (created by the rotation of the blade during vegetation cutting) properly positions the associated underlying vegetation in a generally vertical position for cutting purposes. The lawn mower blade 10 also comprises a longitudinal axis, centrally located along the main body portion 11 and is shown by dotted line 32 in FIG. 1. The raised center portion 22 extends lengthwise about the longitudinal axis 32. The mower blade length L is generally greater than the length of the elevational profile 40, however this is not required.

With reference now to FIGS. 1 and 2, the maximum height h or highest elevational point of the raised center portion 22 may be about the center of rotation 18. The high elevational profile 40 forms an angle α with a horizontal line. The preferred angle α is between 5 and 85 degrees. It is most preferred, as shown in FIG. 2, that angle α be between 10 and 15 degrees. This gradual reduction in blade height (from the center of rotation 18 toward the end portions 14, 16) along the longitudinal axis 32 provides for an overall reduction in weight while maintaining the required blade strength. As the raised center portion 22 approaches center of rotation 18, the center portion height gradually, increases until it reaches the plateau portion 19.

Referring to FIG. 1, the raised center portion 22 comprises a width 44, wherein the width 44 is greatest about a transverse axis, shown by dotted line 33. As shown, the transverse axis 33 intersects the center of rotation 18; however, it may be defined anywhere along the length of the mower blade 10. The center portion width 44 gradually decreases as the raised center portion 22 extends past the plateau portion 19 and towards the first and second end portions 14, 16. The center portion width 44 is usually less than the actual blade width W. It is also within the scope of the present invention that the blade width W and the raised center portion width 44 be equal.

Referring now to FIGS. 1–5, the lawn mower blade 10 can be made of any material; however, it is preferred that the material not be heat-treated. This allows the lawn mower blade 10 to absorb energy from any sudden impact with obstacles it may encounter. This is particularly useful in sandy conditions where sand is constantly beating against the lawn mower blade 10. The present invention may be made of 1018 mild carbon steel that is cold rolled. Any other type of steel may be used, or other material suitable for cutting underlying vegetation. The mower blades 10 are then stamped into the proper formation. Although stamping is the current method used for forming the mower blade 10, any other process may be utilized, including without limitation, cold forming or casting.

With reference now to FIGS. 1–7, because the thickness t of the lawn mower blade is nearly half of those presently known in the art and is generally not heat treated, ribbing 50 is used to increase the durability and strength of a lawn mower blade 10. As shown in FIGS. 1–7, the elevational profile 40 is ribbed in numerous locations As shown in FIGS. 1–7, some of the ribs 50a are generally triangular in shape and are oppositely disposed in substantially symmetric locations about the center of rotation 18. This triangular shape provides for maximum strength along the longitudinal axis 32 while providing an overall lessening of required material as the blade 10 extends toward the end portions 14, 16. As also shown in FIGS. 1–7, additional ribs 50b may be located at the end portions 14, 16 which are generally rectangular in shape. Ribs 50 may be placed in any location along the main body portion 11 and may be of any shape, providing the overall strength of the mower blade 10 is increased.

Figure 6:
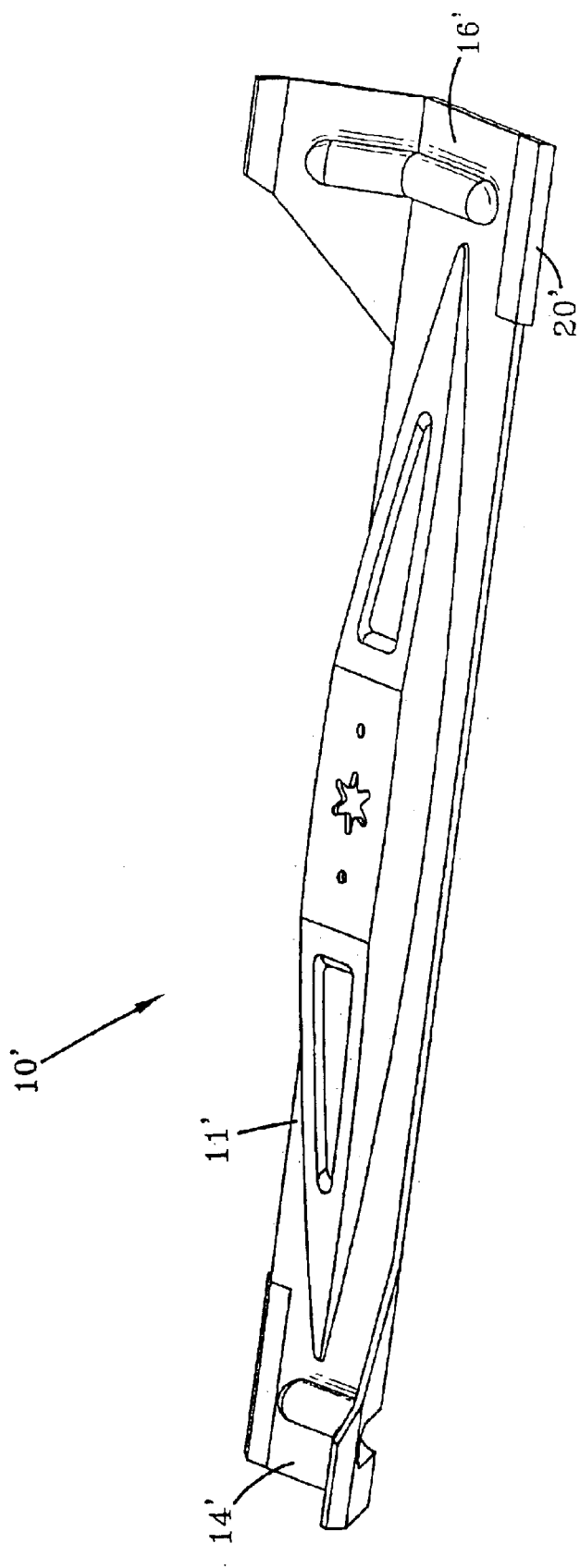
FIG. 6 is a top perspective view of another embodiment of the present invention, having inserted cutting blade portions.
Figure 7:
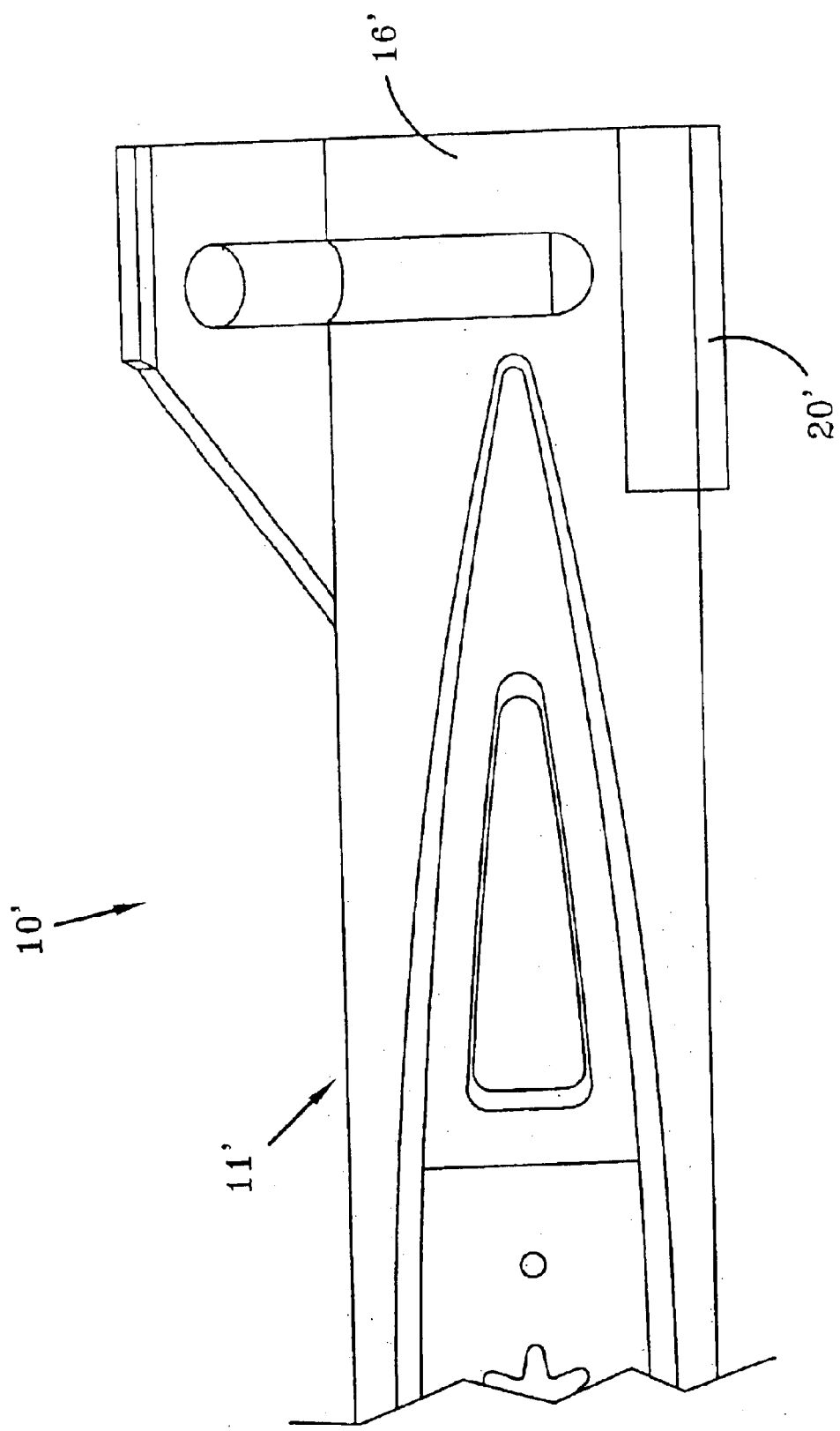
FIG. 7 is a top view of an end portion of the mower blade shown in FIG. 6, showing the attached cutting blade portion.

FIGS. 6 and 7 show another embodiment of the present inventions and similar components are characterized by prime numbers. Even though the material of the main body portion 11' of the blade 10' is soft because it is not heat treated, the cutting edge portions 20' must be harder since it cuts underlying vegetation, as previously stated. The cutting edge portions 20' may be heat treated separately and then attached to the end portions 14', 16'.

The steps for manufacturing the present invention include providing a piece of material, such as sheet metal. The sheet metal is then positioned in the appropriate stamping machine. The sheet metal is then stamped numerous times to obtain the desired shape. Preferably, the lawn mower blade is not heat-treated. At this point, the cutting edge portions 20 may be machined to form a sharpened edge. Alternatively, the cutting edge portions 20' may be separately manufactured, heat-treated, and then attached to the main body portion as shown in FIGS. 6 and 7.

Although the present invention has been described in considerable detail with reference to certain preferred versions thereof, other versions are possible. Therefore, the spirit aid scope of the appended claims should not be limited to the description of the preferred versions contained herein.

What is claimed is:

1. A mower blade adapted to be used on an associated mower deck, the mower blade comprising:
   a main body portion having a thickness t, a length L, a width W and first and second end portions substantially equidistant from a center of rotation, each of said first and second end portions having a cutting edge;
   a raised center portion having an elevational profile, said elevational profile having a height h, such that the main body portion thickness and the height form a ratio h/t being at least 2 to 1, said center portion having a top and first and second flanges, said flanges extending downwardly from said top, said flanges extending substantially the length of said main body portion; and,
   wherein said elevational profile increases at an angle $\alpha$ as said first and second end portions approach a plateau portion, said main body portion remaining substantially planar.

2. The mower blade of claim 1, wherein said angle $\alpha$ is in the range of approximately ten to fifteen degrees.

3. The mower blade of claim 2, wherein said raised center portion has its highest elevation point about the center of rotation.

4. The mower blade of claim 3, wherein said center portion defines a cavity thereunder.

5. The mower blade of claim 4, further comprising:
   a pair of oppositely disposed flange positions operatively connected to said end portions opposite of said cutting edge, each flange portion extending upwardly from each respective end portion such that air flow properly positions the associated underlying vegetation to be cut.

6. A mower blade adapted to be used on an associated mower deck, the mower blade comprising:
   a main body portion having a thickness t, a length L, a width W and first and second end portions substantially equidistant from a center of rotation, each of said first and second end portions having a cutting edge;
   a raised center portion defining a cavity thereunder and having its highest elevation point about said center of rotation, said raised center portion comprises a width, said width being greatest about a transverse axis of said blade, said transverse axis intersecting said center of rotation, said width gradually decreasing as said raised center portion extends towards said first and second end portions;
   said raised center portion having an elevational profile, said elevational profile having a height h, such that the main body portion thickness and the height form a ratio h/t being at least 2 to 1, said center portion having a top and first and second flanges, said flanges extending downwardly from said top, said flanges extending substantially the length of said main body portion;
   wherein said elevational profile increases at an angle $\alpha$ as said first and second end portions approach a plateau portion, said main body portion remaining substantially planar, wherein said angel $\alpha$ is in the range of approximately ten to fifteen degrees; and
   a pair of oppositely disposed flange portions operatively connected to said end portions opposite of said cutting edge, each flange portion extending upwardly from each respective end portion such that air flow properly positions the associated underlying vegetation to be cut.

7. The mower blade of claim 6, wherein said raised center portion width is less than the width W of said main body portion.

8. The mower blade of claim 7, wherein said raised center portion and first and second end portions are an integral piece of metal material.

9. The mower blade of claim 8, wherein said cutting edge has a higher yield strength than said raised center portion and said first and second end portions.

10. The mower blade of claim 9, wherein said main body portion thickness to height ratio h/t is at least 10 to 1.

11. The mower blade of claim 9, wherein said main body portion thickness to height ratio h/t is about 16 to 1.

12. A mower blade adapted to be used on an associated mower deck, the mower blade, comprising:
    a main body portion having a thickness of approximately 0.075 inches, a length L, a width W and first and second end portions substantially equidistant from a center of rotation, each of said first and second end portions having a cutting edge; and
    a raised center portion having a elevational profile, said elevational profile having a height h, such that the main body portion thickness and the height form a ratio h/t being at least 2 to 1, said center portion having a top and first and second flanges, said flanges extending downwardly from said top, said flanges extending substantially the length of said main body portion.

13. The mower blade of claim 12, wherein said elevational profile increases at an angle $\alpha$ as the first and second end portions approach a plateau portion.

14. The mower blade of claim 13, wherein said angle $\alpha$ is in the range of approximately ten to fifteen degrees.

15. The mower blade of claim 14, wherein said raised center portion has its highest elevation point about the center of rotation.

16. The mower blade of claim 15, wherein said raised center portion defines a cavity thereunder.

17. The mower blade of claim 16, further comprising:
    a pair of oppositely disposed flange portions operatively connected to said end portions opposite of said cutting edge, each flange portion extending upwardly from each respective end portion such that air flow properly positions the associated underlying vegetation to be cut.

18. The mower blade of claim 17, wherein said raised center portion comprises a width, said width being greatest about a transverse axis of said blade, said transverse axis intersecting said center of rotation, said width gradually decreasing as said raised center portion extends towards said first and second end portions.

19. The mower blade of claim 18, wherein said raised center portion width is less than the width W of said main body portion.

20. The mower blade of claim 19, wherein said raised center portion and first and second end portions are an integral piece of metal material.

21. The mower blade of claim 20, further comprising a ribbing portion.

22. The mower blade of claim 21, wherein said ribbing portion is an indentation integrally formed with said main body portion.

23. The mower blade of claim 22, wherein said main body portion thickness to height ratio h/t is at least 10 to 1.

24. The mower blade of claim 22, wherein said main body portion thickness to height ratio h/t is about 16 to 1.

25. The mower blade of claim 23 or 24, wherein said cutting edge has a higher yield strength than said raised center portion and said first and second end portions.

26. The mower blade of claim 25, wherein said raised center portion and said first and second end portions are formed of a non-heat treated material.

27. The mower blade of claim 26, wherein said non-heat treated material is 1018 mild carbon steel.

28. A mower blade adapted to be used on an associated mower deck, the mower blade comprising:
a main body portion having a thickness t, a length L, a width W and first and second end portions substantially equidistant from a center of rotation, each of said first and second end portions having a cutting edge;
a raised center portion having a high elevational profile, said raised center portion having its highest elevation point about the center of rotation, said raised center portion comprising a plateau portion and a width, said width being greatest about a transverse axis of said blade, said transverse axis intersecting said center of rotation, said width gradually decreasing as said raised center portion extends past said plateau portion and towards said first and second end portions, said raised center portion width being less than the width W of said main body portion, said high elevational profile having a maximum height h, such that the ratio of said main body portion thickness to said maximum height h/t is at least 2 to 1, said high elevational profile defining a cavity, said high elevational profile increasing at an angle $\alpha$ as the first and second end portions approach said plateau portion at angle $\alpha$ being in the range of approximately ten to fifteen degrees;
a pair of oppositely disposed flange portions operatively connected to said end portions opposite of said cutting edge, each flange portion extending upwardly from each respective end portion such that air flow properly positions the associated underlying vegetation to be cut, said flange portions, said raised center portion, and first and second end portions being an integral piece of non-heat treated 1018 mild carbon steel, said cutting edge having a higher yield strength than said raised center portion, first and second end portions and said flange portions; and
a plurality of ribbing portions, each of said plurality of ribbing portions being an indentation integrally formed with said main body portion and being positioned in a substantially symmetric orientation about the center of rotation.

* * * * *